(12) United States Patent
Chuang et al.

(10) Patent No.: US 7,624,224 B1
(45) Date of Patent: Nov. 24, 2009

(54) SYSTEM AND METHOD FOR DIRECTLY EXECUTING CODE FROM BLOCK-BASED MEMORY

(75) Inventors: Shang-Tse Chuang, Los Altos, CA (US); Stephen D. Lew, Sunnyvale, CA (US); Gerrit A. Slavenburg, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 744 days.

(21) Appl. No.: 11/301,650

(22) Filed: Dec. 13, 2005

(51) Int. Cl.
*G06F 12/00* (2006.01)
(52) U.S. Cl. ...................................... 711/101
(58) Field of Classification Search ............... None
See application file for complete search history.

(56) References Cited

U.S. PATENT DOCUMENTS

| | | | | |
|---|---|---|---|---|
| 7,302,517 B2* | 11/2007 | Lim et al. | ........... | 711/103 |
| 7,340,566 B2* | 3/2008 | Voth et al. | ........... | 711/137 |
| 7,346,021 B2* | 3/2008 | Yoshizawa et al. | ........... | 370/322 |
| 2006/0107032 A1* | 5/2006 | Paaske et al. | ........... | 713/2 |

OTHER PUBLICATIONS

Application Note AN1935, How to Boot from a Single Level Cell NAND Flash Memory, STMicroelectronics, www.st.com, Nov. 2004.
Alternatives to Using NAND Flash White Paper, M-Systems, Aug. 2003.
Samsung's Digital World, 128Mb/256Mb OneNAND™ Flash Memory, Samsung, www.samsung.com.

* cited by examiner

*Primary Examiner*—Hiep T Nguyen
(74) *Attorney, Agent, or Firm*—Zilka-Kotab, PC

(57) ABSTRACT

A system, method, and computer program product are provided for directly executing code in block-based memory, which resides in communication with a processor and a controller. Utilizing the controller, a request is received from the processor for a subset of a block of data in the block-based memory, and at least a portion of the block is retrieved from the block-based memory. After the retrieval, at least a portion of the block is stored in a cache. The subset of the block is then transmitted to the processor, utilizing the controller. To this end, code in the block-based memory is directly executed.

25 Claims, 4 Drawing Sheets

SYSTEM AND METHOD FOR DIRECTLY EXECUTING CODE FROM BLOCK-BASED MEMORY

FIELD OF THE INVENTION

The present invention relates to memory devices, and more particularly to directly executing code from memory.

BACKGROUND

Recently, more and more consumer electronics applications require a system with no disk drive. In these applications, flash memory is often used as a primary storage device. Flash memory has become increasingly popular as it provides a type of non-volatile memory with high reliability, high density, and a small profile.

Basically, there are two types of flash memory commonly used in the foregoing consumer electronics applications, namely NOR and NAND flash memory. In use, NOR flash memory may be directly accessible through an address and data bus, similar to other memory devices such as static random access memory (SRAM)-type devices. This SRAM-like interface allows central processors to directly execute from the NOR flash memory without the need for additional on-chip memory. To this end, code may be directly executed from memory [e.g. execute-in-place (XIP), etc.].

On the other hand, NAND flash memory uses a single bus for both address and data transfer. Further, accesses to NAND flash memory take place in blocks, similar to disk drives, etc. Since NAND flash memory is up to four (4) times cheaper (per bit) with respect to NOR flash memory, it is an ideal candidate for mass storage environments. Unfortunately, however, support for XIP operations is not typically possible using NAND flash memory, since data is available for retrieval only in block format.

Thus, in the past, off-chip memory such as dynamic random access memory (DRAM), SRAM, etc. has been used for storing blocks of data retrieved from block-based NAND flash memory, prior to direct execution. To this end, the processor may directly execute code from the off-chip memory. Unfortunately, however, such a technique is not conducive to integrated and/or cost-effective solutions. Further, block-based memory is more susceptible to errors (e.g. single-bit errors, wear-leveling-related errors, manufacturing-related errors, etc.), with respect to the more reliable NOR flash memory.

Moreover, in such prior art systems, more reliable on or off-chip memory such as read only memory (ROM), NOR flash memory, electrically erasable programmable ROM (EEPROM), etc. is required to provide the processor with instructions, control logic, etc. necessary to program an associated controller to copy the blocks of data from the NAND flash memory, prior to direct execution from the off-chip memory. Again, such a technique is not conducive to providing a cost-effective solution.

There is thus a need for overcoming these and/or other problems associated with the prior art.

SUMMARY

A system, method, and computer program product are provided for directly executing code in block-based memory, which resides in communication with a processor and a controller. Utilizing the controller, a request is received from the processor for a subset of a block of data in the block-based memory, and at least a portion of the block is retrieved from the block-based memory. After the retrieval, at least a portion of the block is stored in a cache. The subset of the block is then transmitted to the processor, utilizing the controller. To this end, code in the block-based memory is directly executed.

DETAILED DESCRIPTION

Figure 1:
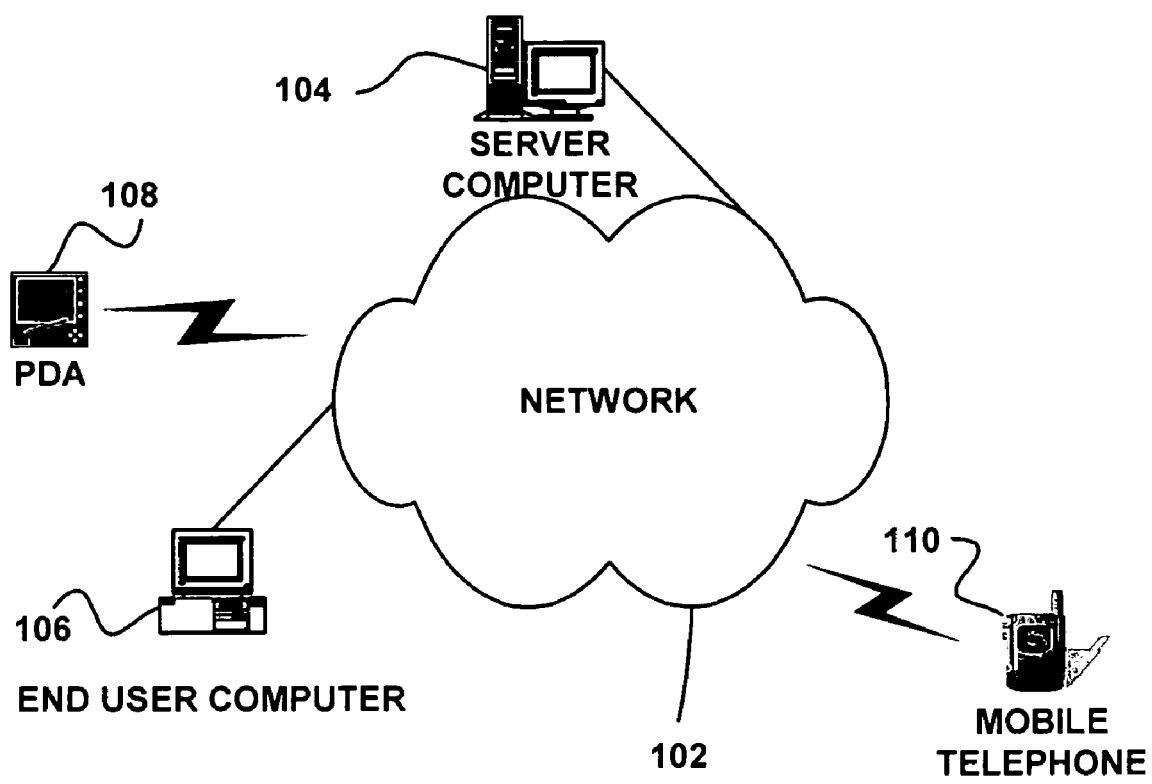
FIG. 1 illustrates a network architecture, in accordance with one embodiment.

FIG. 1 illustrates a network architecture 100, in accordance with one embodiment. As shown, a network 102 is provided. In the context of the present network architecture 100, the network 102 may take any form including, but not limited to a telecommunications network, a local area network (LAN), a wireless network, a wide area network (WAN) such as the Internet, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) 108, a mobile phone 110, etc.

It should be noted that any of the foregoing devices in the present network architecture 100, as well as any other unillustrated hardware and/or software, may be equipped with the capability of directly executing code from block-based memory. More exemplary information regarding such architecture and associated functionality will be set forth hereinafter in greater detail.

Figure 2:
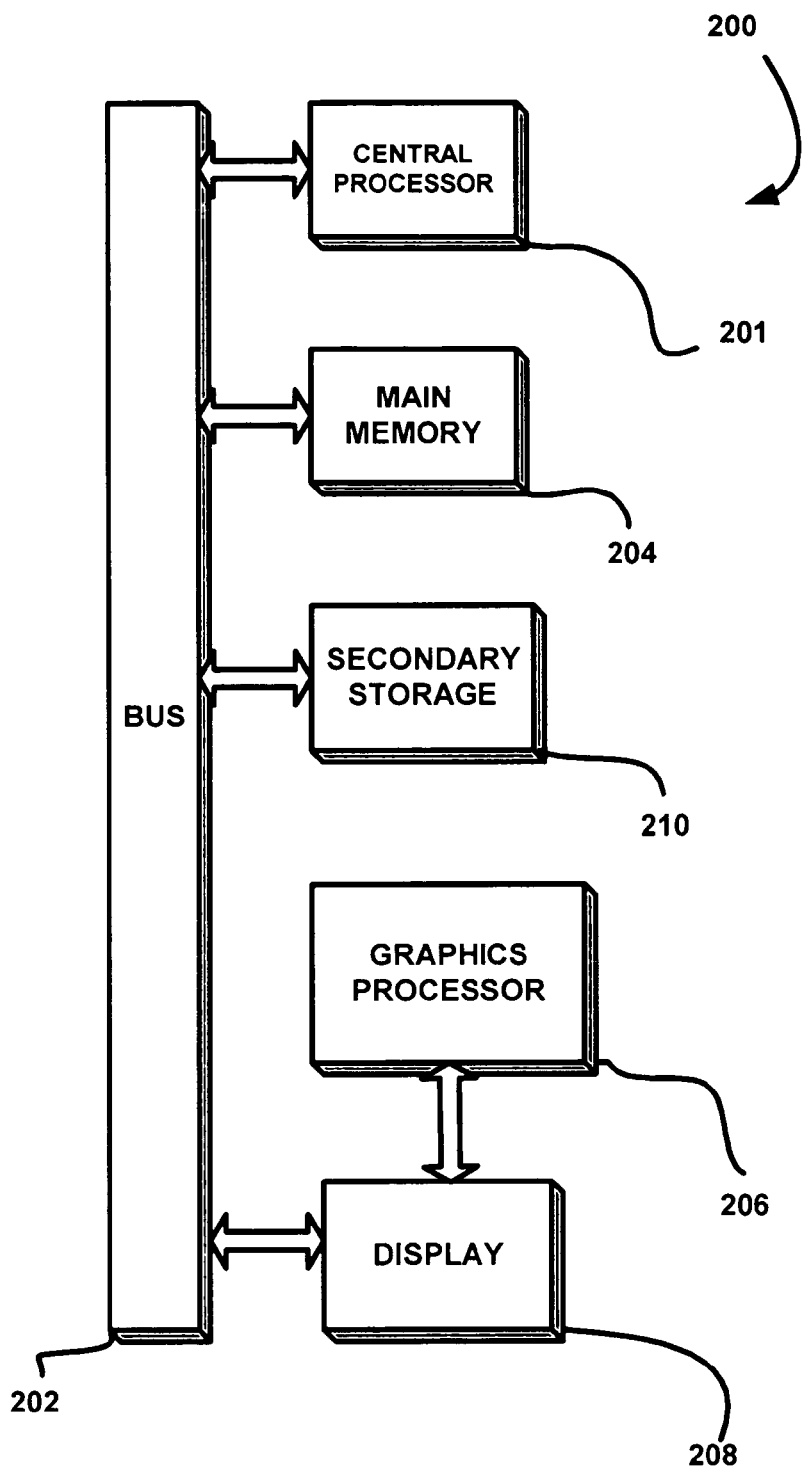
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes a main memory 204. Control logic (software) and data are stored in the main memory 204 which may take the form of random access memory (RAM).

The computer system 200 also includes a graphics processor 206 and a display 208, i.e. a computer monitor. In one embodiment, the graphics processor 206 may include a transform module, a lighting module, and a rasterization module. Each of the foregoing modules may even be situated on a single semiconductor platform to form a graphics processing unit (GPU).

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 200 to perform various functions. Memory 204, storage 210 and/or any other storage are possible examples of computer-readable media.

In one embodiment, the architecture and/or functionality set forth during the description of the following figures may be implemented in the context of the central processor 201, graphics processor 206, a chipset (i.e. a group of integrated circuits designed to work and sold as a unit for performing related functions, etc.), and/or any other integrated circuit(s) for that matter.

Still yet, the architecture and/or functionality of the following figures may be implemented in the context of a general computer system, a circuit board system, a game console system dedicated for entertainment purposes, an application-specific system, and/or any other desired system.

Figure 3:
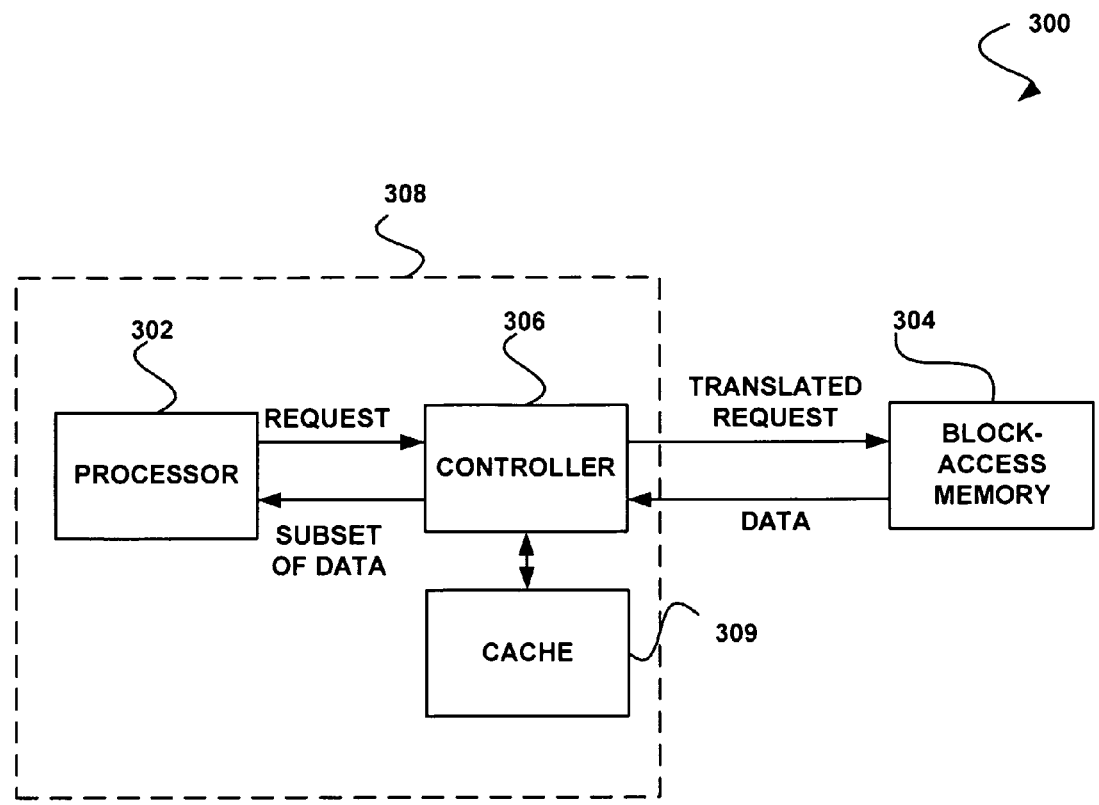
FIG. 3 shows a system for directly executing code from block-based memory, in accordance with one embodiment.

FIG. 3 shows a system 300 for directly executing code from block-based memory, in accordance with one embodiment. As an option, the present system 300 may be implemented in the context of the architecture and environment of FIGS. 1 and/or 2. Of course, however, the system 300 may be implemented in any desired environment.

As shown, an integrated circuit 308 is provided with a plurality of components integrated thereon. Specifically, the integrated circuit 308 is shown to include a processor 302 in communication with a controller 306 which, in turn, is in communication with a cache 309. Further included is a block-based memory 304.

To this end, one embodiment may be implemented in the context of a system-on-chip solution. Of course, other types of solutions are also contemplated. Thus, while certain components are shown in FIG. 3 to reside on the integrated circuit 308 and others are not, it should be noted that the various components disclosed herein may be integrated or not, as desired.

The processor 302 of FIG. 3 may include any processing device capable of processing data, and the controller 306 may include any controlling device capable of controlling the communication of data between the block-based memory 304 and the processor 302. Further, the cache 309 may include static random access memory (SRAM), other types of RAM, and/or any other memory capable of caching data communicated between the block-based memory 304 and the processor 302.

To this end, the cache 309 may take the form of any desired caching architecture. For example, the cache 309 may take the form of a direct mapped caching architecture, where a cache location for a given address is determined from a middle set of address bits. For example, if a cache line size is $2^n$, the bottom n address bits correspond to an offset within a cache entry. Further, if the cache can hold $2^m$ entries, the next middle m address bits provide the cache location. Finally, the remaining top address bits may be stored as a "tag" along with the cache entry.

As another example, the cache 309 may take the form of a fully-associative caching architecture. In such embodiment, the data from any address may be stored in any cache location, and the whole address may be used as a tag. Such tags may be compared simultaneously (i.e. associatively) with the requested address and if one matches, the associated data may be accessed. This, of course, requires an associative memory to store the tags.

As yet another example, the cache 309 may take the form of a set-associative caching architecture which is a compromise between a direct mapped caching architecture and a fully-associative caching architecture. In the present architecture, each address may be mapped to a certain set of cache locations. The address space may further be divided into blocks of $2^m$ bytes (e.g. the cache line size), and the bottom m address bits may be discarded. Thus, an "n-way set-associative" cache with s sets has n cache locations in each set. Block b may be mapped to set "b mod s," and may be stored in any of the n locations in that set using the upper address bits as a tag. To determine whether block b is in the cache, set "b mod s" may be searched associatively for the tag.

With respect to the block-based memory 304, such memory may include NAND flash memory, a disk drive, and/or any block-based memory capable of storing data in blocks, and allowing other devices to retrieve such blocks of data. In the context of the present description, such blocks may each include any set of data. In one embodiment, a block may include a page of data. Of course, however, the block may include any data set.

In use, a request is received from the processor 302 at the controller 306, for a subset of a block of data in the block-based memory 304, as shown. In an embodiment where the block of data includes a page, such subset of the block may include a word of data. Further, in an optional embodiment where a system address space associated with the request may be mapped to a physical block of data in the block-based memory 304, such request may optionally be translated using the controller 306.

Next, at least a portion of the block (e.g. the entire block or portion thereof, etc.) is retrieved from the block-based memory 304, utilizing the controller 306. To this end, at least a portion of the block (e.g., again, the entire block or any portion thereof, etc.) may be stored in the cache 309. Thereafter, the subset of the block may be transmitted to the processor 302, utilizing the controller 306.

By this feature, the subset of the block may be utilized for directly executing code in the block-based memory 304. In the context of the present description, such direct execution may include any execution of application code directly from the block-based memory 304, without requiring the entire application to be copied from the block-based memory 304 prior to execution. In one embodiment, such direct execution may include execute-in-place (XIP) operations.

To this end, the controller 306 may, in some embodiments, operate under the control of the processor 302 without intervention from (or need of) other more reliable on-chip memory such as read only memory (ROM), NOR flash memory, electrically erasable programmable ROM (EEPROM), etc. As mentioned previously, such other memory was previously required to provide the processor 302 with instructions, control logic, etc. necessary to instruct the controller 306 to copy the blocks of data from the NAND flash memory 304, prior to direct execution.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
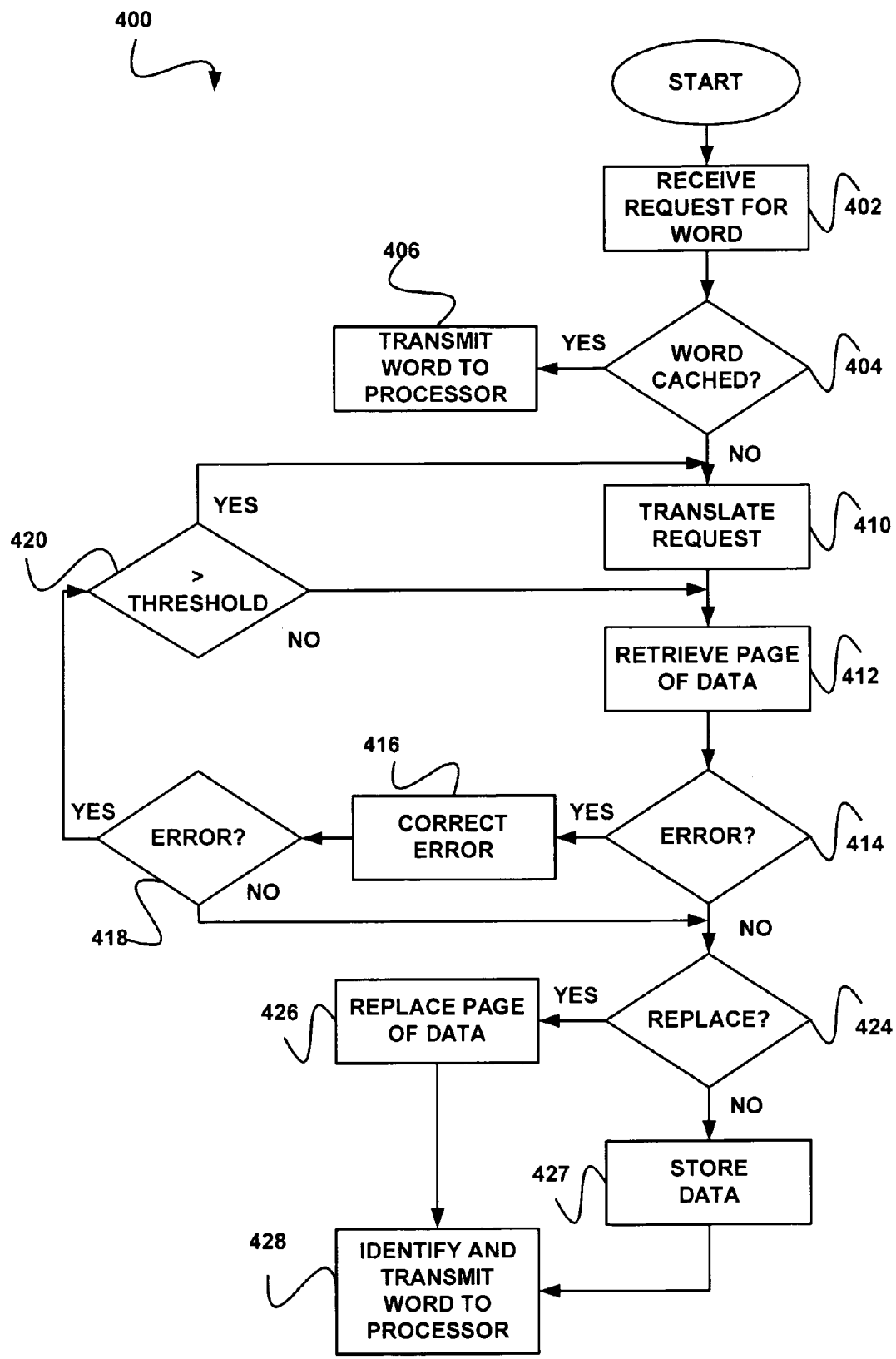
FIG. 4 shows a method for directly executing code from block-based memory, in accordance with one embodiment.

FIG. 4 shows a method 400 for directly executing code from block-based memory, in accordance with one embodiment. As an option, the present method 400 may be implemented in the context of the architecture and environment of FIGS. 1-3. Of course, however, the method 400 may be carried out in any desired environment.

In use, a request is received for a word of data from block-based memory (e.g. see, for example, the block-based memory 304 of FIG. 3, etc.), as indicated in operation 402. Such request may be received from a processor (e.g. see, for example, the processor 302 of FIG. 3, etc.) by a controller (e.g. see, for example, the controller 306 of FIG. 3, etc.).

As set forth earlier, pages of data are retrieved from the block-based memory and temporarily stored in a cache (e.g. see, for example, the cache 309 of FIG. 3, etc.). Thus, it is next determined in decision 404, whether a page associated with the requested word of data is already cached. If so, the word of data is transmitted to the processor, directly from the cache, in operation 406.

On the other hand, if it is determined that the word of data is not cached in decision 404, a translation is carried out. As mentioned hereinabove, the request from the processor in operation 402 may be in system address space which may be mapped to a physical page of data using any desired data structure and/or technique. To this end, in operation 410, the request may be translated to identify a physical page of data, for being retrieved in operation 412.

The block-based memory may be subject to errors. Thus, in decision 414, it may be determined whether an error exists in the retrieved page of data. Such determination may be carried out in any desired manner. For example, Hamming codes may be utilized. Hamming codes include sets of error-correction codes that may be used to detect and correct bits of data using an associated parity scheme. Of course, in other embodiments, Reed-Solomon codes and/or any other desired error correction technique may be utilized.

If an error is identified in decision 414, such error may be corrected in operation 416. It is again determined, in decision 418, whether an error exists. If not, the method 400 may continue. If the error still exists, however, it is determined in decision 420, whether an error has been found more than a predetermined amount of times. See decision 420. If not, the page may simply be re-retrieved in operation 412.

On the other hand, if the associated threshold has been exceeded in decision 420, the request may be translated again in operation 410, in order to correct any error that may have resulted from the previous translation. Specifically, in one embodiment, the translation of the request may be adjusted so as to retrieve a different copy or instance of the page in the cache. To this end, multiple instances of the data pages may be retrieved in response to the detection of an uncorrectable error in the retrieved data page, until a predetermined threshold has been reached.

While not shown, an interrupt or other type of alert may be initiated if even the re-translation does not rectify the situation. In one embodiment, a second threshold may be used to determine whether the method 400 should be terminated as opposed to pursuing operations 410 and 412. To this end, a dual-threshold approach may be implemented.

As mentioned previously, a plurality of pages of data may be stored in the cache. Thus, it may be determined in decision 424 as to which, if any, already-cached pages should be replaced. Such determination may be carried out utilizing any desired technique such as a least recently-used (LRU) algorithm, an algorithm that ensures that most-likely needed pages are available for retrieval, and/or any other desired replacement policy. Further, the decision 424 may be a function, at least in part, of the decision 404. For example, if a particular cached page is accessed with high frequency in decision 404, it may not necessarily be replaced via decision 424.

Thus, if a replacement is deemed necessary per decision 424, a particular page of data is replaced in operation 426. On the other hand, the page of data may simply be stored in operation 427, especially if the cache is still partially empty. Once cached, the appropriate word of the page may be identified and transmitted to the processor, for direct execution purposes. Note operation 428.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
receiving a request from a processor for a subset of a block of data in block-based memory, utilizing a controller in communication with the processor and the block-based memory;
retrieving at least a portion of the block from the block-based memory, utilizing the controller;
storing at least a portion of the block in a cache; and
transmitting the subset of the block to the processor, utilizing the controller;
wherein code in the block-based memory is directly executed by executing application code directly from the block-based memory, while avoiding a requirement that an entirety of an application be copied from the block-based memory prior to the executing thereby avoiding a need of memory on a chip including the processor.

2. The method of claim 1, wherein the block-based memory is error-prone.

3. The method of claim 1, wherein the block of data includes a page of data.

4. The method of claim 1, wherein the block-based memory includes a disk drive.

5. The method of claim 1, wherein the block-based memory includes NAND flash memory.

6. The method of claim 1, wherein the cache is positioned on an integrated circuit on which the controller and the processor resides.

7. The method of claim 1, and further comprising determining whether the subset of the block is cached, after receiving the request.

8. The method of claim 7, wherein the block of data is conditionally retrieved based on the determination.

9. The method of claim 7, wherein the at least a portion of the block is retrieved in response to the determination that the subset of the block is cached, and wherein the request is translated to a physical page of data for being retrieved in response to the determination that the subset of the block is not cached.

10. The method of claim 1, wherein the retrieved block of data replaces a cached block of data based on a replacement policy.

11. The method of claim 1, and further comprising correcting an error associated with the retrieved block of data.

12. The method of claim 11, wherein the error is corrected utilizing Hamming codes.

13. The method of claim 11, wherein the error is corrected utilizing Reed-Solomon codes.

14. The method of claim 1, wherein the retrieved block of data is cached utilizing a direct mapped caching architecture.

15. The method of claim 1, wherein the retrieved block of data is cached utilizing a set-associative caching architecture.

16. The method of claim 1, wherein the retrieved block of data is cached utilizing a fully-associative caching architecture.

17. The method of claim 1, wherein a system address space associated with the request is mapped to a physical block of data.

18. The method of claim 1, wherein multiple instances of the block of data are retrieved in response to the detection of an uncorrectable error in the retrieved block of data.

19. The method of claim 1, wherein the direct execution of the code in the block-based memory includes a plurality of execute-in-place (XIP) operations.

20. The method of claim 1, wherein the code in the block-based memory is directly executed such that the controller operates under control of the processor without intervention from the memory on the chip including the processor.

21. The method of claim 1, wherein the code in the block-based memory is directly executed for avoiding a requirement that the memory on the chip including the processor provides the processor with instructions for instructing the controller to copy the subset of the block of data from NAND flash memory.

22. The method of claim 1, wherein the memory on the chip including the processor includes at least one of read only memory (ROM), NOR flash memory, and electrically erasable programmable ROM (EEPROM).

23. A computer program product embodied on a computer readable medium, comprising:
    computer code for receiving a request from a processor for a subset of a block of data in block-based memory, utilizing a controller in communication with the processor and the block-based memory;
    computer code for retrieving at least a portion of the block from the block-based memory, utilizing the controller;
    computer code for storing at least a portion of the block in a cache; and
    computer code for transmitting the subset of the block to the processor, utilizing the controller;
    wherein code in the block-based memory is directly executed by executing application code directly from the block-based memory, while avoiding a requirement that an entirety of an application be copied from the block-based memory prior to the executing, thereby avoiding a need of memory on a chip including the processor.

24. An apparatus, comprising:
    a controller in communication with a processor and block-based memory, the controller, under the control of the processor without intervention from other memory, capable of receiving a request from the processor for a subset of a block of data in the block-based memory, retrieving at least a portion of the block from the block-based memory, storing at least a portion of the block in a cache, and transmitting the subset of the block to the processor;
    wherein code in the block-based memory is directly executed by executing application code directly from the block-based memory, while avoiding a requirement that an entirety of an application be copied from the block-based memory prior to the executing, thereby avoiding a need of memory on a chip including the processor.

25. The apparatus of claim 24, wherein the processor is in communication with a display.

* * * * *